United States Patent [19]
Okazoe et al.

[11] Patent Number: 5,762,884
[45] Date of Patent: Jun. 9, 1998

[54] FLUE GAS TREATING SYSTEM

[75] Inventors: Kiyoshi Okazoe; Toyoshi Nakagawa; Atsushi Tatani, all of Tokyo, Japan

[73] Assignee: Mitsubishi Jukogyo Kabushiki Kaisha, Tokyo, Japan

[21] Appl. No.: 667,067

[22] Filed: Jun. 20, 1996

[30] Foreign Application Priority Data

Sep. 8, 1995 [JP] Japan .................... 7-231147

[51] Int. Cl.$^6$ .............. B01D 50/00; C01B 17/00; C01F 11/46
[52] U.S. Cl. .............. 422/171; 422/169; 422/178; 422/225; 422/231; 55/228
[58] Field of Search ............ 422/171–172, 422/169, 225, 178, 231; 423/243.08, 243.01, 242.1, 555; 210/400; 55/228

[56] References Cited

U.S. PATENT DOCUMENTS

| | | |
|---|---|---|
| 4,627,970 | 12/1986 | Krüger .................. 423/555 |
| 4,976,936 | 12/1990 | Rathi et al. ............ 423/555 |

FOREIGN PATENT DOCUMENTS

| | | |
|---|---|---|
| 0442047 A1 | 12/1990 | European Pat. Off. |
| 3001258 A1 | 1/1980 | Germany . |
| 3145779 A1 | 11/1981 | Germany . |

*Primary Examiner*—Hien Tran
*Attorney, Agent, or Firm*—Bell Seltzer Intellectual Property Law Group; Alston & Bird LLP

[57] ABSTRACT

This invention relates to a flue gas treating system including a desulfurization apparatus for bringing flue gas into contact with a calcium compound-containing slurry so as to cause sulfur dioxide present in the flue gas to be absorbed into the slurry, oxidizing the slurry having undergone contact with flue gas, and subjecting the oxidized slurry to solid-liquid separation so as to obtain gypsum as a by-product; a waste water treating apparatus for treating part of a first filtrate produced during solid-liquid separation of the slurry having undergone contact with flue gas in the desulfurization apparatus; and solid-liquid separation device for subjecting sludge produced in the waste water treating apparatus to solid-liquid separation independently of the slurry having undergone contact with flue gas, wherein a solid material separated from the sludge by the solid-liquid separation device is incorporated into the gypsum and all of a second filtrate produced during solid-liquid separation of the sludge by the solid-liquid separation device is introduced into the waste water treating apparatus together with part of the first filtrate. In this system, the dumping disposal of sludge produced in the waste water treating apparatus is not required and the concentration of impurities in the absorbent slurry within the desulfurization apparatus can be kept on a low level.

2 Claims, 5 Drawing Sheets

TO VACUUM CHAMBER

FLUE GAS TREATING SYSTEM

BACKGROUND OF THE INVENTION

1. Field of the Invention

This invention relates to a flue gas treating system wherein the dumping disposal of sludge produced in the waste water treating apparatus is not required and, moreover, the concentration of impurities in the absorbent slurry within the desulfurization apparatus can be kept on a low level so as to facilitate, for example, the maintenance of a high degree of desulfurization and the maintenance of complete oxidation for the efficient recovery of high-quality gypsum.

2. Description of the Related Art

In recent years, flue gas desulfurization apparatus wherein flue gas is brought into contact with an absorbent slurry (containing a calcium compound such as limestone) in an absorption tower so as to have sulfur dioxide present in the flue gas absorbed into the slurry, and the slurry having undergone contact with flue gas is oxidized and then subjected to solid-liquid separation so as to obtain gypsum as a by-product have come to be widely used in electric power plants and the like. In flue gas treating systems using such desulfurization apparatus, the filtrate (consisting essentially of water) resulting from the separation of gypsum is recycled for use as the liquid component constituting the absorbent slurry. However, mere recycling of the filtrate causes impurities (such as chlorine) contained in flue gas to accumulate in the circulating water at high concentrations, thus inhibiting the absorption reactions and the gypsum-forming reactions. Accordingly, part of the aforesaid filtrate is usually withdrawn into a waste water treating apparatus, subjected to waste water treatment, and then disposed of (for example, by discharging it to the outside). On the other hand, clean water containing no impurities is supplied as make-up water for filling up the shortage of the liquid component constituting the absorbent slurry.

In the waste water treating apparatus, waste water treatment including the removal of harmful materials, COD control, decomposition, absorption, pH adjustment and the like is carried out in order to clear the standards for waste water. However, a considerable amount of sludge is produced during this treatment and poses a problem because great expense is required for its disposal. More specifically, the solid component of this sludge consists of $Mg(OH)_2$ and $CaSO_4 \cdot 2H_2O$ (gypsum) that are formed by the reaction of $MgSO_4$ contained in the filtrate with the neutralizing agent $[Ca(OH)_2]$, as well as $Fe(OH)_3$ and $Al(OH)_3$ that are formed from Fe and Al contained in the filtrate and precipitated by pH adjustment from the acid to the alkaline side. This sludge is not necessarily harmful, but it is legally forbidden to dump the sludge as such. In early days, therefore, such sludge was subjected to special solidification treatment or the like prior to dumping. However, since such solidification treatment or the like is disadvantageous from the viewpoint of equipment cost and operating cost, the method employed in recent years is to dispose of the sludge by incorporating it into the slurry withdrawn from the absorption tower of the desulfurization apparatus for the purpose of gypsum separation.

An example of a conventional flue gas treating system based on this conventional process is explained with reference to FIG. 6. This system includes a desulfurization apparatus comprising an absorption tower 1 and the like, and is equipped with a waste water treating apparatus 20 for treating and discharging part of the circulating water of the desulfurization apparatus. In this example, the desulfurization apparatus is provided with a rotating-arm air sparger 3 for blowing air C into the slurry within the tank 2 of absorption tower 1 in the form of fine air bubbles while stirring the slurry, so that the absorbent slurry having sulfur dioxide absorbed therein is brought into efficient contact with air C and thereby completely oxidized to form gypsum.

More specifically, in this desulfurization apparatus, untreated flue gas A is introduced into a flue gas inlet section 1a of absorption tower 1 and brought into contact with an absorption slurry injected from header pipes 5 by means of a circulating pump 4 so as to absorb and remove sulfur dioxide present in untreated flue gas A. The resulting flue gas is discharged as treated flue gas B from a flue gas outlet section 1b. The absorbent slurry injected from header pipes 5 flows downward through a layer of packing material 6 while absorbing sulfur dioxide, and enters tank 2 where it is oxidized by contact with a large number of air bubbles blown thereinto while being stirred with air sparger 3, and then undergoes a neutralization reaction to form gypsum. The predominant reactions occurring in the course of these treatments are represented by the following reaction formulas (1) to (3).

(Flue gas inlet section of absorption tower)

$$SO_2 + H_2O \rightarrow H^+ + HSO_3^- \tag{1}$$

(Tank)

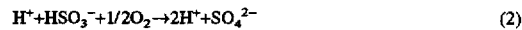

$$H^+ + HSO_3^- + 1/2 O_2 \rightarrow 2H^+ + SO_4^{2-} \tag{2}$$

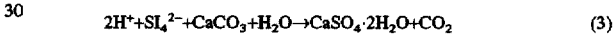

$$2H^+ + SO_4^{2-} + CaCO_3 + H_2O \rightarrow CaSO_4 \cdot 2H_2O + CO_2 \tag{3}$$

Thus, the slurry within tank 2 comes to have suspended or dissolved therein gypsum and a small amount of limestone used as absorbent. This slurry is withdrawn by means of a slurry pump 7 and fed to a mixing tank 8 where it is mixed with a relatively slight amount of sludge D withdrawn from the waste water treating apparatus. The slurry having a slight amount of sludge D mixed therein is transferred to a vacuum belt filter 10 by means of a slurry pump 9 and subjected to solid-liquid separation. Thus, there is recovered gypsum E having a low water content (usually of about 10%) and containing a light amount of impurities. On the other hand, filtrate F from vacuum belt filter 10 is sucked into a vacuum chamber 12 which is evacuated by a vacuum pump 11, and transferred to a filtrate tank 13 by way of this vacuum chamber 12. Most of filtrate F within filtrate tank 13 is sucked out by means of a pump 14 and transferred to a slurry tank 15 where an alkaline material G (such as limestone) is added thereto. The resulting absorbent slurry is recycled to tank 2 by means of a slurry pump 16. Although the supply of water to this desulfurization apparatus is not shown, this can be done, for example, by supplying clean water containing no impurities to slurry tank 15 as required.

On the other hand, part of filtrate F within filtrate tank 13 is sucked out by means of a pump 17 and transferred to waste water treating apparatus 20 where it is subjected to waste water treatment and then disposed of, for example, by discharging it as waste fluid H. Sludge D produced in waste water treating apparatus 20 is withdrawn to the side of the desulfurization apparatus and, as described above, mixed with the slurry withdrawn from absorption tower 1 in mixing tank 8. Thus, the solid component thereof is incorporated into gypsum E formed as a by-product. However, because of the slight amount of the solid component of the sludge D, the purity of gypsum E is not reduced to such an extent as to preclude the solid component of sludge D's use as a material for the manufacture of gypsum plasterboards and cement.

Thus, in the conventional flue gas treating system, sludge D produced in waste water treating apparatus 20 is disposed of by incorporating it into gypsum E obtained as a by-product in the desulfurization apparatus. This is highly advantageous in that troublesome operations for subjecting sludge D to special solidification treatment prior to dumping, as well as equipment used therefor, are unnecessary. In the above-described conventional construction, however, the slurry (before solid-liquid separation) withdrawn from the absorption tower and sludge D (before solid-liquid separation) withdrawn from waste water treating apparatus 20 are previously mixed in mixing tank 8 and then collectively dehydrated by belt filter 10. This is disadvantageous in that, since the resulting filtrate F contains the liquid component of sludge D, part of the liquid component of sludge D is returned to absorption tower 1 by way of filtrate tank 13 and pump 14, resulting in, for example, a reduced degree of desulfurization in the desulfurization apparatus.

That is, part of the circulating water which is withdrawn from the desulfurization apparatus and transferred to the waste water treating system in order to remove impurities therefrom is returned to the slurry within the desulfurization apparatus. As a result, there is a possibility that the concentration of impurities (such as chlorine) in the absorbent slurry within the desulfurization apparatus may exceed its designed permissible level. This causes the disadvantage that the degree of desulfurization may be reduced, the materials of the equipment and the instruments may be corroded, and the above-described oxidation and neutralization reactions for the formation of gypsum may be inhibited to increase the content of impurities (such as unreacted limestone) in gypsum E and result in the inability to meet the quality requirements for gypsum.

It has been known that the adverse influence of impurities can be suppressed by adjusting the pH of the slurry to a high level (for example, of 5 or above) by the addition of an alkaline agent to the tank 2 of the absorption tower. The fact is that, in practice, disadvantages such as a significant reduction in the degree of desulfurization are barely avoided by such pH adjustment. Even in this case, the above-described conventional construction allows part of the purposely withdrawn impurities to return to the circulating water within the desulfurization apparatus. This unavoidably causes the disadvantage that the amount of alkaline agent added may be increased, the concentration of impurities may vary, and it may become difficult to control the amount of alkaline agent added.

SUMMARY OF THE INVENTION

Accordingly, it is an object of the present invention to provide a flue gas treating system wherein the troublesome dumping disposal of sludge produced in the waste water treating apparatus is not required and, moreover, the liquid component of the sludge is prevented from returning to the desulfurization apparatus so that the concentration of impurities in the absorbent slurry can be kept on a low level so as to facilitate, for example, the maintenance of a high degree of desulfurization.

In order to accomplish the above object, the present invention provides a flue gas treating system comprising a desulfurization apparatus for bringing flue gas into contact with a calcium compound-containing slurry so as to cause sulfur dioxide present in the flue gas to be absorbed into the slurry, oxidizing the slurry having undergone contact with flue gas, and subjecting the oxidized slurry to solid-liquid separation so as to obtain gypsum as a by-product; a waste water treating apparatus for treating part of a first filtrate produced during solid-liquid separation of the slurry having undergone contact with flue gas in the desulfurization apparatus; and solid-liquid separation means for subjecting sludge produced in the waste water treating apparatus to solid-liquid separation independently of the slurry having undergone contact with flue gas, wherein a solid material separated from the sludge by the solid-liquid separation means is incorporated into the gypsum and all of a second filtrate produced during solid-liquid separation of the sludge by the solid-liquid separation means is introduced into the waste water treating apparatus together with part of the first filtrate.

In a preferred embodiment of the present invention, the aforesaid solid-liquid separation means comprises a vacuum belt filter having therein a vacuum space for sucking in the filtrate, the belt filter is provided with a partition for dividing the vacuum space into two compartments in a direction perpendicular to the traveling direction of the belt filter, the compartments divided by the partition are connected with separate vacuum chambers to define two solid-liquid separation regions for carrying out solid-liquid separation independently on both lateral sides of the belt filter, and the sludge is subjected to solid-liquid separation in one of the solid-liquid separation regions while the slurry having undergone contact with flue gas is subjected to solid-liquid separation in the other solid-liquid separation region.

In the present invention, the solid component of sludge produced in the waste water treating apparatus is disposed of by incorporating it into gypsum, while the liquid component of the sludge (i.e., the second filtrate) is wholly introduced into the waste water treating apparatus together with part of the first filtrate and, therefore, does not return to the absorbent slurry within the desulfurization apparatus.

Moreover, in a preferred embodiment, two solid-liquid separation regions for carrying out solid-liquid separation independently are defined on both lateral sides of the belt filter, and the sludge is subjected to solid-liquid separation in one of the solid-liquid separation regions while the slurry having undergone contact with flue gas in the desulfurization apparatus is subjected to solid-liquid separation in the other solid-liquid separation region. In this case, solid-liquid separation of the sludge and the slurry having undergone contact with flue gas can be carried out under different conditions (pressure conditions) by use of a single belt filter.

According to the present invention, although this system is constructed so that the solid component of sludge produced in the waste water treating apparatus is disposed of by incorporating it into gypsum, the liquid component of the sludge (i.e., the second filtrate) is positively prevented from returning to the absorbent slurry within the desulfurization apparatus. This surely prevents a large amount of impurities such as chlorine from accumulating in the circulating water of the desulfurization apparatus. Consequently, it is readily possible to achieve a high degree of desulfurization and good corrosion resistance of the equipment, and efficiently recover high-quality gypsum meeting quality requirements, while securing the ease of disposal of the sludge.

Moreover, the above-described preferred embodiment has the unique advantage that solid-liquid separation of the sludge and the slurry can be carried out under different conditions (pressure conditions) by use of a single belt filter, resulting in a further reduction in equipment cost and operating cost.

DETAILED DESCRIPTION OF PREFERRED EXAMPLES (First Example)

Figure 6:
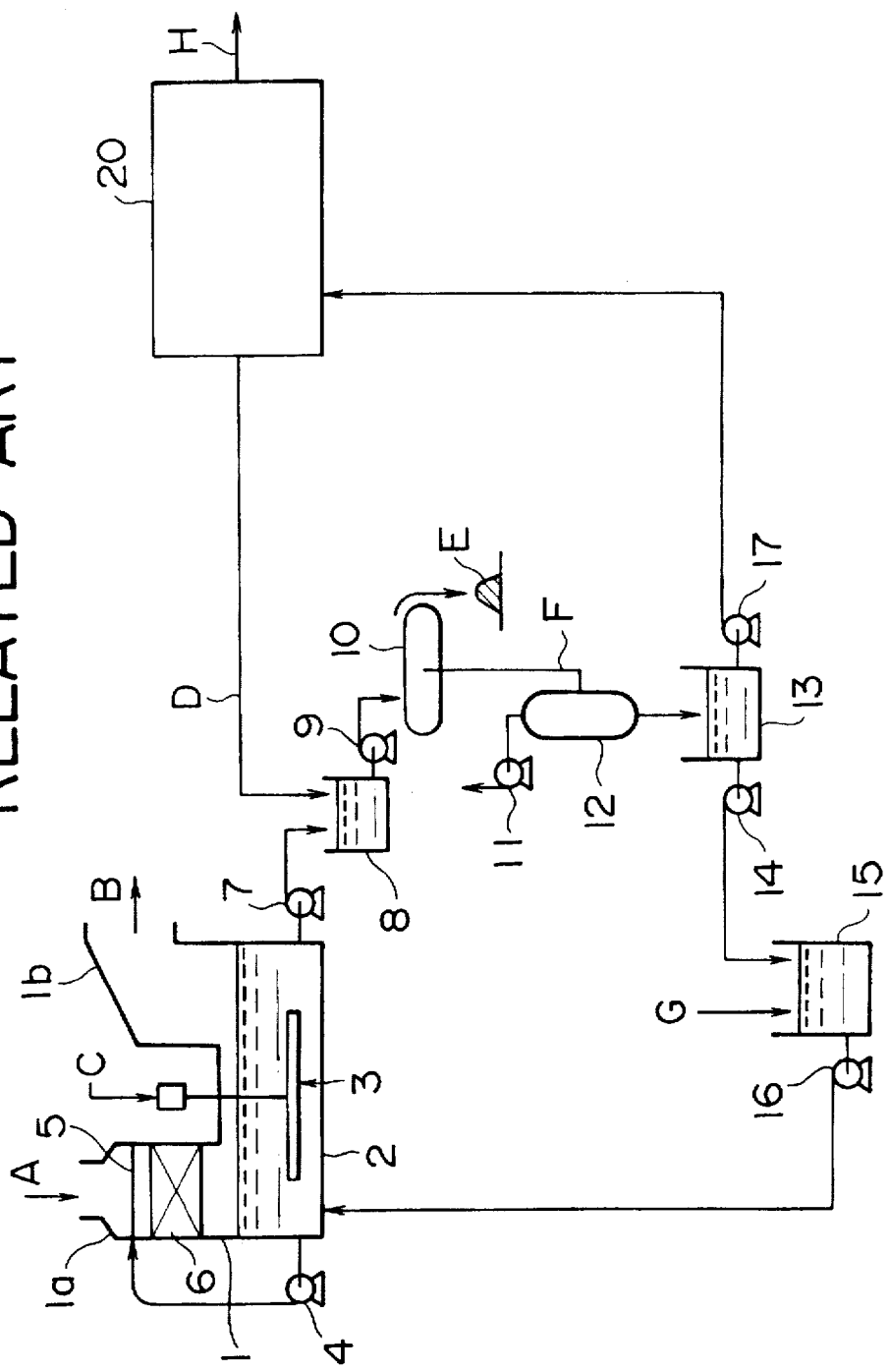
FIG. 6 is a schematic view illustrating an example of a conventional flue gas treating system.

A first example of the present invention is described hereinbelow with reference to FIGS. 1 to 3. In the following description, the same elements as mentioned above in connection with the conventional system illustrated in FIG. 6 are designated by the same reference numerals, and the explanation of common parts is omitted.

Figure 1:
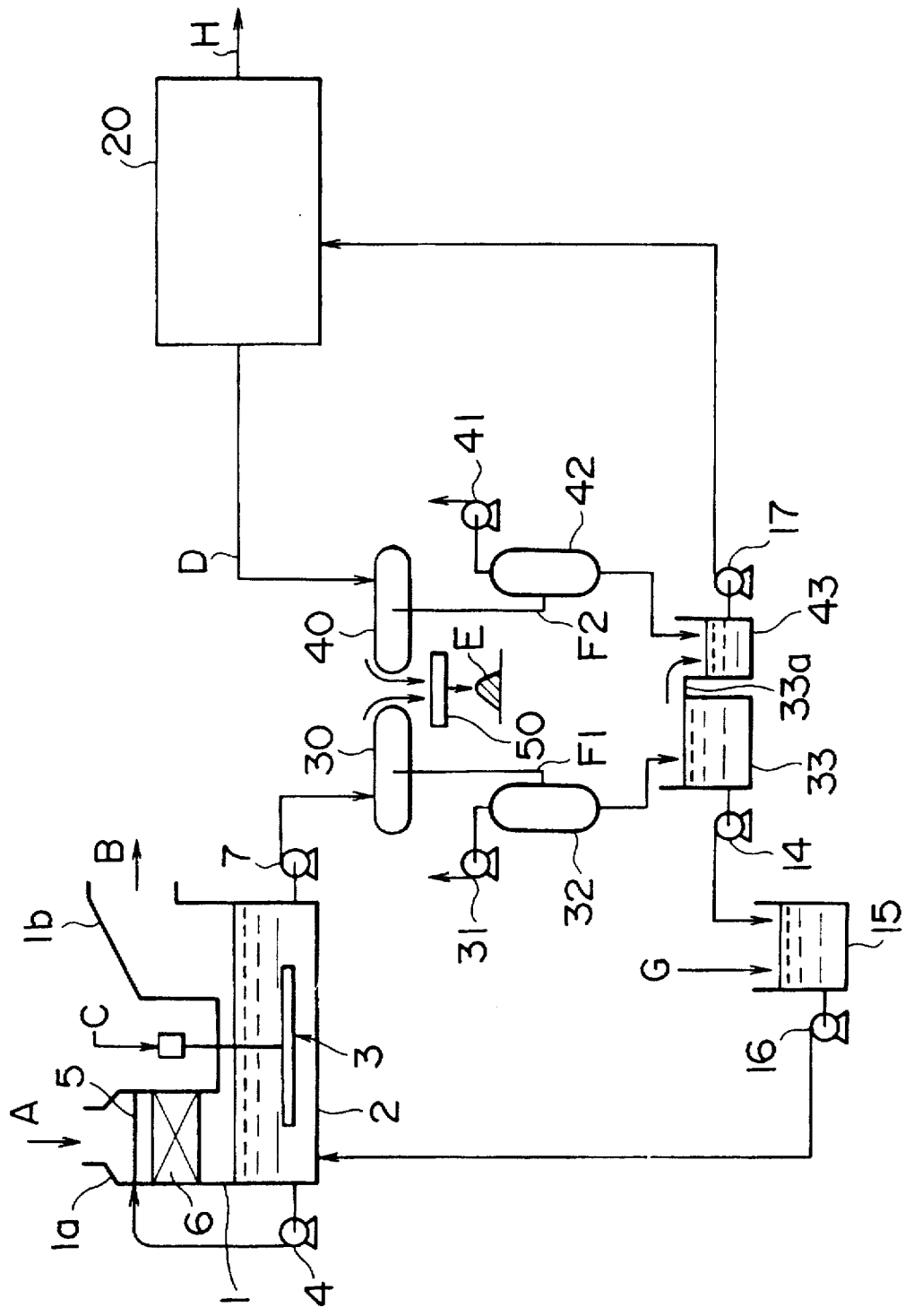
FIG. 1 is a schematic view illustrating the construction of a flue gas treating system in accordance with a first example of the present invention.

As illustrated in FIG. 1, the flue gas treating system in accordance with this example is equipped with a belt filter 30 used for solid-liquid separation of the slurry withdrawn from absorption tower 1, and a belt filter (or solid-liquid separation means) 40 used for independent solid-liquid separation of sludge D withdrawn from waste water treating apparatus 20.

In this case, these belt filters 30 and 40 are disposed so that their ends at which the resulting solid material is discharged are opposed to each other. The solid materials (i.e., gypsum and a slight amount of impurities) separated by these belt filters 30 and 40 are mixed to some extent by being carried on an identical belt conveyor 50 as shown in FIG. 1, and collectively recovered as gypsum E. Alternatively, a mixer may be installed in order to mix the solid materials separated by belt filters 30 and 40. Moreover, although the belt conveyor 50 shown in FIG. 1 travels in a direction perpendicular to the traveling directions of belt filters 30 and 40 (i.e., a direction perpendicular to the plane of the figure), it may be disposed in parallel or oblique relationship to belt filters 30 and 40.

On the other hand, the filtrates separated by belt filters 30 and 40 are sucked out through two separate lines and recovered. More specifically, the slurry filtrate F1 separated by belt filter 30 (i.e., the first filtrate) is sucked into a vacuum chamber 32 evacuated by a vacuum pump 31, and then transferred to a first filtrate tank 33 by way of this vacuum chamber 32. The slurry filtrate F2 separated by belt filter 40 (i.e., the second filtrate) is sucked into a vacuum chamber 42 evacuated by a vacuum pump 41, and then transferred to a second filtrate tank 43 by way of this vacuum chamber 42. First filtrate tank 33 and second filtrate tank 43 are connected by an overflow path 33a, so that part of first filtrate F1 within first filtrate tank 33 is introduced into second filtrate tank 43 by way of this overflow path 33a and, together with second filtrate F2, transferred to waste water treating apparatus 20. In this case, the liquid levels are controlled, for example, by presetting or regulating the delivery rates of pumps 14 and 17, so that second filtrate F2 within second filtrate tank 43 will not flow backward to first filtrate tank 33.

In order to lessen the load of each belt filter 30 or 40, a cyclone or other separator for preliminarily subjecting the slurry or sludge to some degree of solid-liquid separation may be installed on the upstream side of each belt filter 30 or 40. In this case, the separated liquid component may be, for example, returned directly to tank 2 or introduced into the corresponding vacuum chamber 32 or 42.

Figure 2:
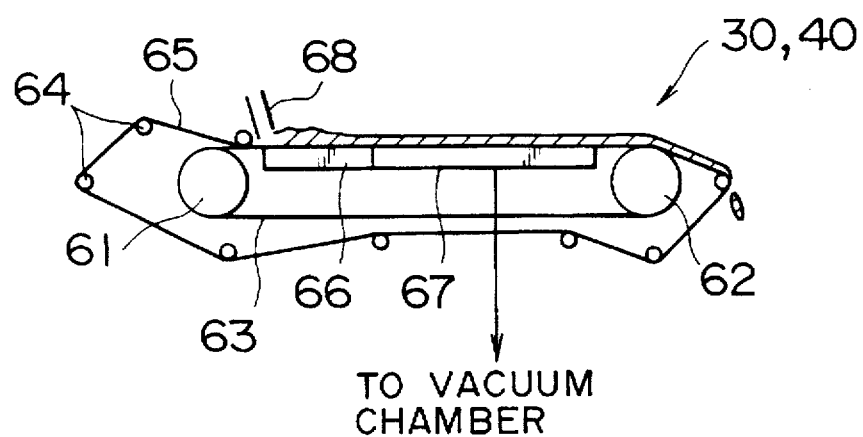
FIG. 2 is a side view of a belt filter (or solid-liquid separation means) used in the first example of the present invention.
Figure 3:
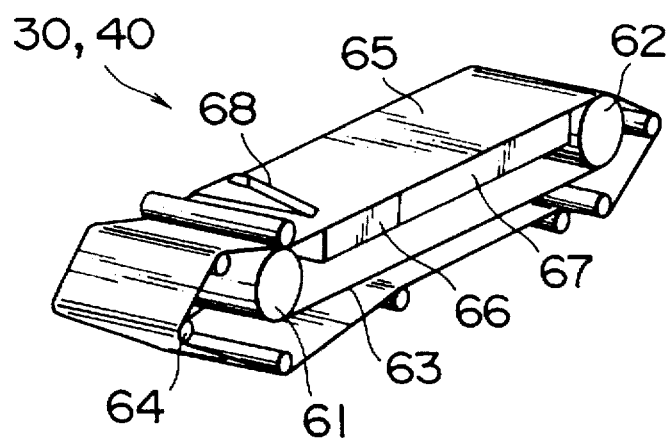
FIG. 3 is a perspective view of the belt filter (or solid-liquid separation means) used in the first example of the present invention.

Each of belt filters 30 and 40 is a vacuum filter of the horizontal belt type and may be constructed, for example, as illustrated in FIG. 2 and FIG. 3 (perspective view). Specifically, each belt filter 30 or 40 comprises two rotatably supported drums 61 and 62; a perforated belt 63 mounted on and driven by these drums 61 and 62 so as to travel horizontally; a plurality of guide rollers 64 disposed around perforated belt 63 such that the guide rollers 64 lie in parallel with drums 61 and 62; an endless belt of filter cloth 65 guided and driven by these guide rollers 64 so that, on the upper side, it travels with its back surface in contact with perforated belt 63; a slurry loading pan 66 and a vacuum pan (or vacuum space) 67 disposed so that their upper open ends face the back surface of the upper side of perforated belt 63; and a loader 68 for supplying a slurry or the like to filter cloth 65 at the upstream end (or loading site) of perforated belt 63.

Slurry loading pan 66 is disposed so as to cover a definite upstream range (i.e., the filtration range) of perforated belt 63 where a slurry or the like is loaded onto filter cloth 65 and subjected to simple gravity filtration therethrough, and serves to receive the filtrate separated from the slurry or the like loaded onto filter cloth 65. This slurry loading pan 66 is designed so that the filtrate can be discharged as required. Vacuum pan 67, which constitutes the vacuum space of the present invention, is disposed so as to cover a definite downstream range (i.e., the dehydration range) of perforated belt 63. In order to subject the slurry or the like to vacuum filtration in this dehydration range, vacuum pan 67 is designed so that its upper open end is in sliding contact with the back surface of perforated belt 63 while maintaining sealability, and is connected with the corresponding vacuum chamber as shown in FIG. 2. In this case, loader 68 comprises a divergent nozzle having an upper end, which is connected with a pipeline (not shown) for supplying a slurry or the like, and a lower open end, which is widen toward a tip, and serves to distribute the slurry or the like evenly along the width of filter cloth 65.

Now, the operation of the flue gas treating system constructed in the above-described manner is explained hereinbelow.

An absorbent slurry is fed from slurry tank 15 to tank 2 by means of slurry pump 16. On the basis of the above-described functions of circulating pump 4 and rotating-arm air sparger 3, the desulfurization of flue gas and the formation of gypsum as a by-product are effected in the same manner as described above in connection with the conventional flue gas treating system. Thus, in a steady state, the slurry within tank 2 has gypsum and a small amount of limestone suspended or dissolved therein. In this case, part of the slurry within tank 2 is withdrawn by means of slurry pump 7 and transferred directly to belt filter 30 where it is subjected to solid-liquid separation. On the other hand, sludge D produced in waste water treating apparatus 20 is transferred to belt filter 40 where it is subjected to solid-liquid separation independently of the aforesaid slurry. The solid materials (comprising gypsum and a slight amount of impurities) separated by these belt filters 30 and 40 are mixed to some extent by being carried on an identical belt conveyor 50 as shown in FIG. 1, and collectively recovered as gypsum E. Consequently, the troublesome dumping disposal of sludge D including its solidification is not required.

On the other hand, filtrates F1 and F2 separated by belt filters 30 and 40 are independently sucked out through the above-described two lines and transferred to first filtrate tank 33 and second filtrate tank 43, respectively. Part of first filtrate F1 within first filtrate tank 33 is introduced into second filtrate tank 43 by way of overflow path 33a and, together with second filtrate F2, transferred to waste water treating apparatus 20. Thus, second filtrate F2 within second filtrate tank 43 is prevented from flowing backward to first filtrate tank 33.

Consequently, although this system is constructed so that the solid component of sludge D is disposed of by incorporating it into gypsum E, the liquid component of sludge D (i.e., second filtrate F2) is positively prevented from returning to the absorbent slurry of the desulfurization apparatus. In other words, part of the circulating water constituting the absorbent slurry of the desulfurization apparatus (i.e., part of first filtrate F1) is successively discharged to waste water treating apparatus 20, and never returned to the desulfurization apparatus at least in an impurity-containing state. This surely prevents a large amount of impurities such as chlorine from accumulating in the circulating water of the desulfurization apparatus. Consequently, it is readily possible to achieve a high degree of desulfurization and good corrosion resistance of the equipment and recover high-quality gypsum efficiently, while securing the ease of disposal of sludge D.

(Second Example)

Next, a second example of the present invention is described hereinbelow with reference to FIGS. 4 and 5. In the following description, the same elements as mentioned above in connection with the system of the first example illustrated in FIGS. 1 to 3 are designated by the same reference numerals, and the explanation of common parts is omitted.

Figure 4:
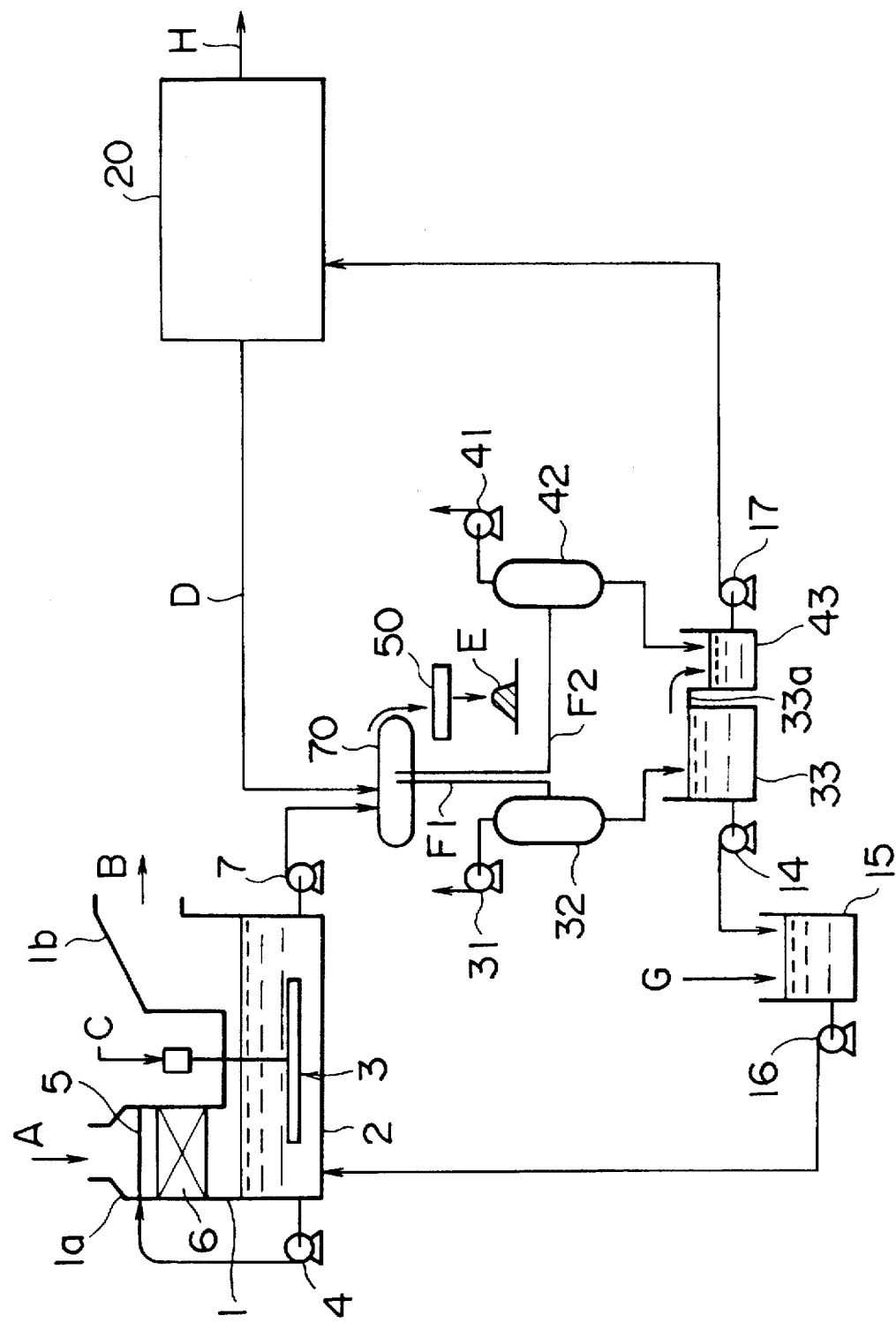
FIG. 4 is a schematic view illustrating the construction of a flue gas treating system in accordance with a second example of the present invention.
Figure 5:
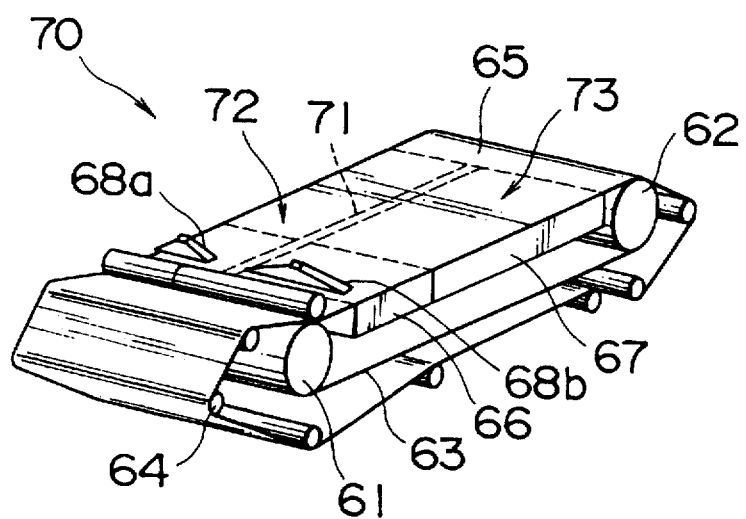
FIG. 5 is a perspective view of a belt filter (or solid-liquid separation means) used in the second example of the present invention.

As illustrated in FIG. 4, the flue gas treating system in accordance with this example is equipped with a single belt filter 70. As illustrated in FIG. 5, this belt filter 70 has a partition 71 for dividing slurry loading pan 66 and vacuum pan 67 along the width of belt-like filter cloth 65. Thus, two solid-liquid separation regions 72 and 73 for carrying out solid-liquid separation independently are defined on both lateral sides of belt filter 70, and two loaders 68a and 68b are installed at the upstream end of these solid-liquid separation regions 72 and 73, respectively.

Bounded by partition 71, one solid-liquid separation region 72 of vacuum pan 67 is connected to vacuum chamber 42, and sludge D from waste water treating apparatus 20 is supplied to loader 68a associated with this solid-liquid separation region 72. Also bounded by partition 71, the other solid-liquid separation region 73 of vacuum pan 67 is connected to vacuum chamber 32, and the slurry having undergone contact with flue gas and withdrawn from absorption tower 2 is supplied to loader 68b associated with this solid-liquid separation region 73.

Thus, sludge D is subjected to solid-liquid separation in solid-liquid separation region 72, while the slurry from absorption tower 2 is subjected to solid-liquid separation in solid-liquid separation region 73. During this process, the pressure (or degree of vacuum) for vacuum separation can be adjusted to the optimum value according to the properties (such as particle diameter) of sludge D or the slurry, by controlling the pressure of the corresponding vacuum chamber 32 or 42.

Also in this case, the slurry having undergone contact with flue gas and withdrawn from absorption tower 2 and sludge D withdrawn from waste water treating apparatus 20 are subjected to solid-liquid separation independently, and the liquid component of sludge D is surely reintroduced into waste water treating apparatus 20 and treated therein without returning to the slurry within the desulfurization apparatus. Consequently, similarly to the first example, it is readily possible to achieve a high degree of desulfurization and good corrosion resistance of the equipment and recover high-quality gypsum efficiently, while securing the ease of disposal of sludge D.

Moreover, this example has the unique advantage that only one belt filter is required, resulting in a further reduction in equipment cost and operating cost.

The present invention is not limited to the above-described examples, but may be practiced in various ways. For example, it is a matter of course that the first solid-liquid separation means of the present invention is not limited to a belt filter but may comprise a centrifugal separator or the like.

What is claimed is:

1. A flue gas treating system comprising:

a desulfurization apparatus comprising an absorption tower for bringing flue gas into contact with a calcium compound containing slurry so as to cause sulfur dioxide present in the flue gas to be absorbed into the slurry, an air supply for oxidizing the slurry having undergone contact with the flue gas, and a first solid-liquid separator for subjecting the oxidized slurry to a first solid-liquid separation so as to obtain gypsum as a by-product and a first-filtrate;

a waste-water treating apparatus for treating one part of the first filtrate produced during said first solid-liquid separation by the first solid-liquid separator, wherein said waste-water treating apparatus produces sludge; and a second solid-liquid separator for subjecting sludge produced in said waste water treating apparatus to a second solid-liquid separation to produce a second filtrate, wherein the second solid-liquid separation is carried out separately of said first solid-liquid separation of the slurry having undergone contact with flue gas, wherein a solid material separated from the sludge by the second solid-liquid separator is incorporated into the gypsum and all of the second filtrate produced during the second solid-liquid separation of the sludge by the second solid-liquid separator is introduced into said waste water treating apparatus together with said one part of the first filtrate, while the other part of the first filtrate is returned without entering said waste water treating apparatus to said desulfurization apparatus so as to be recycled for use in the slurry for absorbing sulfur dioxide without being mixed with the second filtrate.

2. A flue gas treating system comprising:

a desulfurization apparatus comprising an absorption tower for bringing flue gas into contact with a calcium compound-containing slurry so as to cause sulfur dioxide present in the flue gas to be absorbed into the slurry and an air supply for oxidizing the slurry having undergone contact with the flue gas;

a solid-liquid separator comprising a vacuum belt filter having therein a vacuum space for suction being divided by a partition provided parallel to a traveling direction of said belt filter into first and second solid-liquid separation regions, the first solid-liquid separation region subjecting the slurry having undergone contact with the flue gas in said desulfurization apparatus to a first solid-liquid separation so as to obtain gypsum as a by-product and a first filtrate; and a waste water treating apparatus for treating one part of the first filtrate produced during the first solid-liquid separation of the slurry having undergone contact with the flue gas in said desulfurization apparatus, wherein sludge is produced in said waste water treating apparatus, and the second solid-liquid separation region subjects the sludge produced in said waste water treating apparatus to a second solid-liquid separation which produces a second filtrate, both first and second solid-liquid separations being carried out independently of each other, wherein a solid material separated from the sludge in said second solid-liquid separation is incorporated into the gypsum and all of the second filtrate produced during the second solid-liquid separation of the sludge is introduced into said waste water treating apparatus together with said one part of the first filtrate produced during the first solid-liquid separation of the slurry having undergone contact with the flue gas, while the other part of the first filtrate produced during the first solid-liquid separation of the slurry having undergone contact with the flue gas is returned without entering said waste water treating apparatus to said desulfurization apparatus so as to be recycled for use in the slurry for absorbing sulfur dioxide, without being mixed with the second filtrate produced during the second solid-liquid separation of the sludge.

* * * * *

UNITED STATES PATENT AND TRADEMARK OFFICE
CERTIFICATE OF CORRECTION

PATENT NO.   : 5,762,884
DATED        : June 9, 1998
INVENTOR(S)  : Okazoe et al.

It is certified that error appears in the above-identified patent and that said Letters Patent is hereby corrected as shown below:

On the title page;

[56] References Cited

FOREIGN PATENT DOCUMENTS

Line 1, "0442047 A1 12/1990" should be --0442074 A1 8/1991--.

Line 2, "1/1980" should be --8/1980--.

Line 3, "11/1981" should be --5/1983--.

Signed and Sealed this

Ninth Day of February, 1999

Attest:

Attesting Officer

*Acting Commissioner of Patents and Trademarks*